Feb. 11, 1941. E. P. LARSH ET AL 2,231,427
COMPOSITE CAST GEAR AND METHOD OF MAKING SAME
Filed Aug. 18, 1938
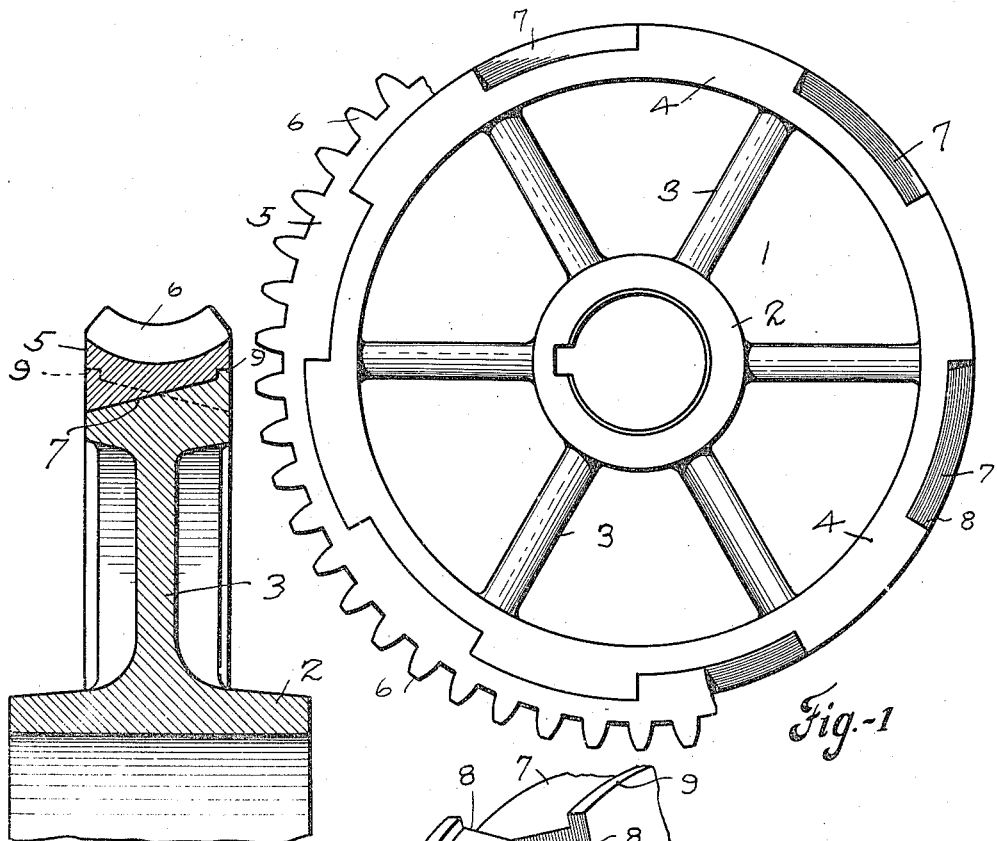
Fig.-1
Fig.-2
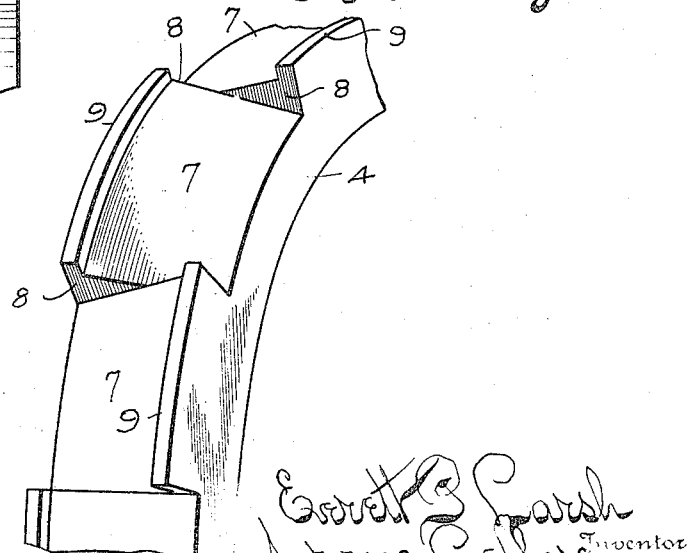
Fig.-3

Patented Feb. 11, 1941

2,231,427

UNITED STATES PATENT OFFICE 2,231,427

COMPOSITE CAST GEAR AND METHOD OF MAKING SAME

Everett P. Larsh, Vandalia, and Jerome Leflar and George W. Lowry, Dayton, Ohio, assignors to The Master Electric Company, Dayton, Ohio, a corporation of Ohio Application August 18, 1938, Serial No. 225,608

6 Claims. (Cl. 22—203)

This invention pertains to composite molded machine elements wherein substantially concentric portions thereof are formed from materials having dissimilar characteristics including those having different coefficients of expansion and contraction and to the process of manufacture thereof.

For illustrative purposes, but with no intent to unduly limit its scope or application, the invention is herein shown and described as embodied in a cast metal gear wheel having a cast iron body and a cast bronze toothed rim. It is to be understood, however, that the invention is not limited thereto but may be embodied in various other mechanical elements, and the herein described method may be applied to manufacture of articles from non-metallic molding materials.

The use of bronze gear wheels is highly desirable, but prohibitive for some purposes because of their cost. The invention forming the subject matter hereof is herein embodied in a wheel element including a hub and radial spokes connecting an inner rim or felloe of cast iron, having irregular peripheral configuration, which is less costly than bronze, which comprises the exterior working rim cast in interlocked relation about the inner cast iron body. Since the coefficients of expansion and contraction of cast iron and bronze differ quite widely, certain pre-heating treatment of the cast iron body is necessary in order that the contraction of the respective materials be sufficiently equalized to maintain a tight interlocked engagement of one with the other without subjecting either to fracture strain.

The object of the invention is to provide a composite machine element of dissimilar cast metals combined into a single unitary body especially applicable to gear wheels having distinctive working faces, which may not only be greatly cheapened in construction and capable of being economically manufactured by minimizing the use of a more expensive facing material, but will be equally efficient in use, of increased durability and strength, capable of being produced without special equipment by ordinary foundry methods, and of pleasing appearance.

A further object of the invention is to provide composite gear wheels and other mechanical elements having bronze working faces or rims surrounding in relatively fixed relation a supporting body of cast iron.

A further object of the invention is to provide improved form of interlocking configuration upon the supporting body and surrounding rim of composite mechanical elements.

A further object of the invention is to provide positive driving engagement of the main body and the surrounding working face of such composite element.

A further object of the invention is to provide interlocking configurations between the main body and rim of dissimilar materials which will resist both axial and circumferential displacement of the respective portions one relative to the other.

A further object of the invention is to provide an improved method of manufacture herein described wherein the relative contraction of the dissimilar materials is substantially equalized.

A further object of the invention is to provide means for minimizing strains and stresses due to unequal contraction in such composite mechanical elements.

A further object of the invention is to provide gear wheels and other elements having the herein mentioned advantageous structural features and the inherent meritorious characteristics.

With the above primary and other incidental objects in view as will more fully appear in the specification, the invention intended to be protected by Letters Patent consists of the features of construction, the parts and combinations thereof, and the mode of operation, or their equivalents, as hereinafter described or illustrated in the accompanying drawing.

Referring to the accompanying drawing, wherein is shown the preferred but obviously not necessarily the only form of embodiment of the invention, Fig. 1 is a side elevation partly broken away of a composite gear wheel constructed in accordance with the present invention.

Fig. 2 is a radial sectional view thereof.

Fig. 3 is a fragmentary perspective view of the felloe or inner rim of the wheel preparatory to casting the outer rim of dissimilar material thereabout.

Like parts are indicated by similar characters of reference throughout the several views.

In the particular embodiment of the invention herein shown and described for illustrative purposes, it being understood that the invention is not limited to gear wheels, I is the main body of cast iron, including a hub 2 and radial spokes 3 connecting with the hub 2 the inner rim or felloe 4, about which is an outer toothed rim 5 of cast bronze.

In practice, the outer rim 5 is cast as a continuous ring having a uniform periphery and the teeth 6 are subsequently hobbed therein.

To afford an efficient and positive driving interlock between the cast iron inner body and the cast bronze rim, the cast iron felloe 4 is stepped, being formed with a succession of angular indentations affording alternately beveled segments 7—7. There are thus formed at alternate sides of the body pockets or shoulders 8 with which corresponding shoulders upon the surrounding rim 5 abut in circumferential direction. To further interlock the members against lateral or axial displacement the reversely inclined steps 7 are formed with marginal ribs or upstanding flanges 9. In casting the exterior rim 5 of bronze or other material having dissimilar characteristics, the pre-formed cast iron central body is employed as a core about which the molten metal of the rim is cast in molten state into exact conformity with the irregular peripheral convolutions of the inner rim or felloe.

However, due to different characteristics of expansion and contraction of cast iron and bronze, and consequent liability of breakage of one member or the other incident to strains induced therein while cooling, the periphery of the cast iron body is first painted with a chill coating mixture such as graphite and linseed oil and is then heated in an oven or retort to a relatively high degree before being inserted in the mold. In practice, the temperature of the cast iron body is raised to four hundred to six hundred degrees Fahrenheit as a preliminary step. The particular degree of temperature will vary somewhat in accordance with the particular bronze alloy or mixture and also will depend somewhat upon the relative sizes of different work pieces. However, in any event, the cast iron body is preheated and expanded to such degree that the cast iron body and the bronze rim subsequently cast thereabout while cooling will contract at an approximately uniform rate, so that destructive stresses and strains are avoided.

The cast iron central body having been preheated to the desired degree is then inserted in a mold where it serves as a core, and the molten bronze poured thereabout. The cast bronze rim is thus made to conform exactly to the configuration of the angularly stepped periphery of the cast iron central member, upon which it engages with a shrink fit.

The alternately inclined steps of angular faces 7—7 prevent lateral displacement and maintain the rim in the plane of the central body, while the shoulders 8 afford the necessary driving torque in addition to that resulting from the shrink fit of the rim upon the central body.

It is to be understood that the gear may be of the web or disc type in lieu of being formed with spokes 3, and that the rim 5 may be of other contour than formed with the teeth 6.

The embodiment of the invention in a gear wheel illustrates but one of a wide variety of mechanical elements to which the present method is applicable. Obviously, various forms of molding plastics may be utilized for one or the other of the respective elements, or indeed for both the elements, in which event the inner body will be pre-formed and subsequently reheated preparatory to molding a surrounding portion thereabout.

The method herein described is especially desirable and effective in those composite assemblies wherein the surrounding rim has a greater coefficient of expansion and contraction than the interior body. However, for some characteristically different materials wherein the ratio of expansion and contraction of the respective elements is reversed or in event the exterior member possesses a relatively low coefficient of expansion and contraction, the inner or core member may be subjected to a preconditioning cooling by which it is contracted or reduced in size preparatory to molding the rim thereabout from other material.

To the contrary, in event that the inner body has the greater factor of expansion and contraction, it may be desirable to subject the preformed rim to cooling and contractile influence preparatory to utilizing such contracted rim as a mold and casting the central body therein. Therefore, broadly, the invention includes thermally treating one member or the other to change the size thereof preparatory to casting the complementary member in situ in assembled relation therewith.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described our invention, we claim:

1. In a composite wheel, a central cast iron body including a succession of peripheral segments each succeeding segment being beveled in a direction laterally of the body substantially from side to side thereof in alternate direction, an upstanding marginal flange coincident with the high side of each beveled segment, and a rim of bronze formed about the central cast iron body and having matching interlocking engagement with the beveled and flanged segments.

2. In a mechanical element, a central body including a peripheral succession of segmental beveled steps extending in successively alternate directions laterally from substantially one side of the body to the other, and a molded surrounding body of different material having a different coefficient of expansion and contraction including a succession of segmental internal beveled steps matching those of the central body in intimate interlocking relation.

3. In a wheel, a central body of cast iron including a stepped felloe including a circumferential succession of alternately directional beveled segments, each succeeding segment extending laterally of the felloe substantially from one side of the body to the other with the high sides of all of the segments lying in the same plane and the alternately beveled segments forming oppositely facing shoulders transversely of the felloe, and a surrounding molded rim of bronze about the cast iron central body in matching relation with the succession of alternately beveled segments of the felloe thereof and having positive interlocking driving engagement therewith.

4. In a wheel, a central body of cast iron including a succession of radially alternately directional offset steps formed about the periphery of the central cast iron body, the steps extending laterally of the body and substantially from one side of the body to the other and forming oppositely facing shoulders transversely of the body, and a molded rim of bronze about the central cast iron body and in matching interlocked engagement with the peripheral steps of said body.

5. The herein described method of molding composite mechanical elements comprising central and surrounding portions having different coefficients of expansion and contraction, which consists in initially molding one portion having one coefficient of expansion and contraction with a surface configuration for association with another portion having a coefficient of expansion and contraction different from the first portion, and which permits of contraction of the second portion in a succession of alternate directional planes each angled laterally of the coincident surface of the first portion and forming a succession of circumferentially spaced laterally extending shoulders, and utilizing the first mentioned portion as a part of a mold form for shaping the second named portion.

6. The herein described method of molding composite mechanical elements comprising central and surrounding portions having different coefficients of expansion and contraction, which consists in initially molding one portion having one coefficient of expansion and contraction with a surface configuration for association with another portion having a coefficient of expansion and contraction different from the first portion, and which permits of contraction of the second portion in a succession of alternate directional planes each angled laterally of the coincident surface of the first portion and extending substantially from one side to the other thereof, and utilizing the first mentioned portion as a part of a mold form for shaping the second named portion.

EVERETT P. LARSH.
JEROME LEFLAR.
GEORGE W. LOWRY.